Aug. 23, 1932.     M. DE FRANCISCO     1,873,302
COLOR PHOTOGRAPHIC MACHINE
Filed Aug. 29, 1929

Inventor
Marshall De Francisco
By his Attorney
Daniel J. McCarthy

Patented Aug. 23, 1932                                               1,873,302

UNITED STATES PATENT OFFICE

MARSHALL DE FRANCISCO, OF BROOKLYN, NEW YORK

COLOR PHOTOGRAPHIC MACHINE

Application filed August 29, 1929. Serial No. 389,219.

This invention relates to color photographic machines.

It has already been proposed to produce color pictures by a system involving the production on a film of a plurality of differently colored monochrome images of the object and by the projection of the monochrome images from the film on a screen in coincidence and superposition. All prior systems have been subject to defects due to parallax and distortion in the monochrome images produced and by poor definition in the film images.

It is the general object of the invention to eliminate and overcome these defects.

With these general objects and others not specifically mentioned in view, the invention consists in the features, combinations, details of constructions and arrangements of parts which will first be described in connection with the accompanying drawing and then more particularly pointed out.

Figure 1:
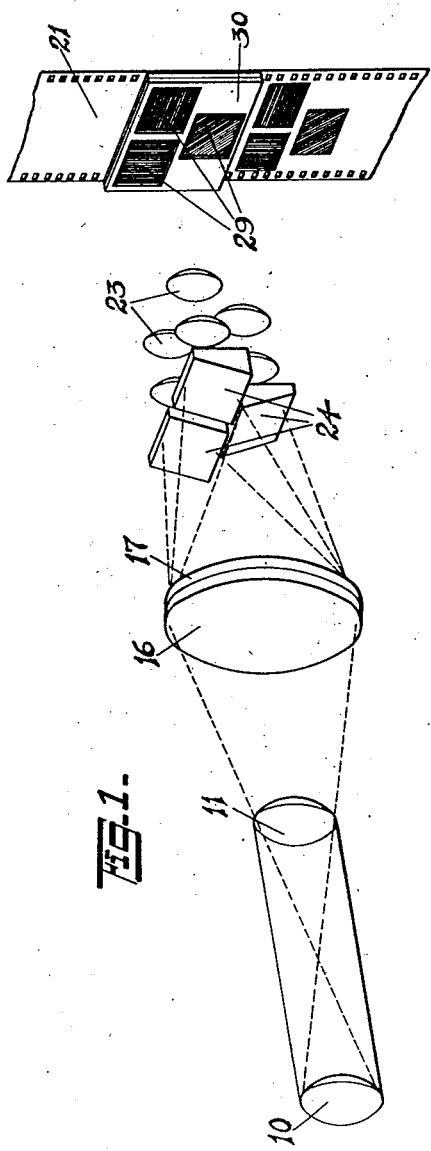
Figure 1 is a perspective diagrammatic view showing an arrangement of elements constituting a camera constructed in accordance with this invention.

The invention is herein illustrated applied to moving colored pictures but is also adapted for stationary or still pictures and for photography in general.

The exemplification shows portions of a moving picture camera incorporating the color system of the invention.

In the embodiment chosen for illustration, means are provided for producing at a predetermined place in the apparatus an image corresponding in colors and configurations to the object photographed. As here shown, the image producing means embody an objective or lens system which is adjustable so as to focus images of objects at different distances at the predetermined place in the apparatus. The objective shown as an example comprises two double-convex lenses 10, 11, carried in a mount 12 which is adjustably mounted in a casing 13 for focusing purposes. Front lens 10 is within a frame 14 adjustably carried in mount 12 and may be adjusted with respect to lens 11.

Figure 2:
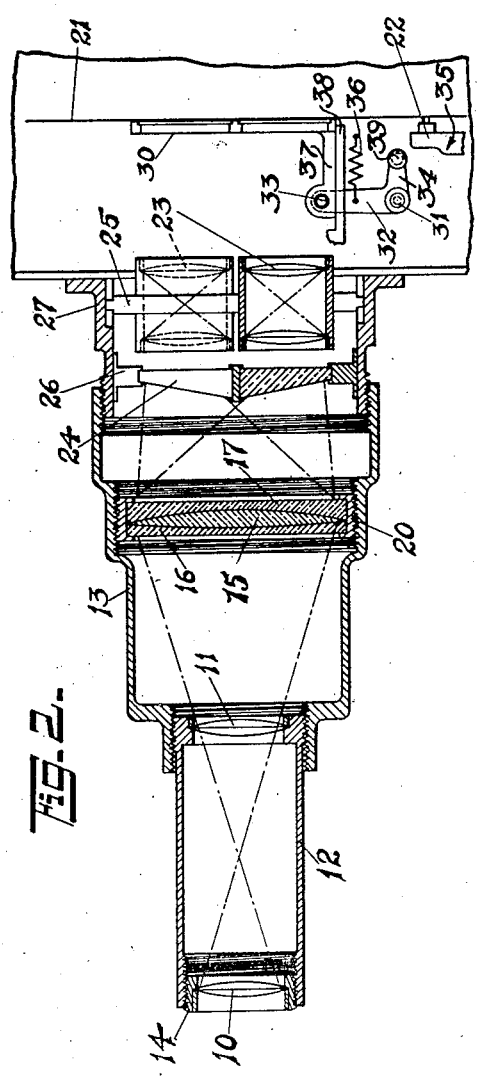
Figure 2 is a longitudinal cross-section through the apparatus.
Figure 3:
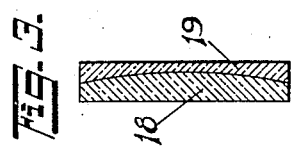
Figure 3 is a sectional view of a modified construction of an element of the apparatus.

Means are provided for fixing the focused image. It is important that the image be fixed with minimum light obstruction and distortion. This is obtained by forming the image-fixing means as a lens with a long focus, theoretically an infinite focus, so that the light rays emit from the fixed image in substantial parallelism without appreciable scattering, diffusion or distortion. As here shown (Figure 2), the image-fixing means may include a double convex lens, 15, with concavo-plano lenses 16, 17, on each side, the concave surfaces of which face the convex surfaces of lens 15 and substantially conform thereto in curvatures so as not to produce distortion. In Figure 3, the image-fixing means comprise two lenses, 18, 19, a plano-convex lens and a plano-concave lens, with curved surfaces adjoining and conforming. In this case, only a single refracting space between lenses is provide. The curvatures and spaces determine the amount of refraction and may be designed for optimum results. The lenses may be cemented with a transparent cement to form a unit which is positioned at the place where the focused image is formed and mounted in a frame 20 within casing 13.

Means are provided for producing a plurality of monochrome or uncolored images on a film from the focused image. Such monochrome images correspond to the object in shapes and configurations but each comprises only that much of the object having a given color. Monochrome images of different colors are produced on a panchromatic film. The monochrome images are faithful simulations of the photographed object and distortion and parallax are substantially eliminated by the means of this invention.

As here shown, the film 21 is threaded in a suitable guideway in the apparatus behind the focused image and fed intermittently in the usual manner, as, for example, by a typical claw construction 22 which is indicated diagrammatically. A plurality of lenses 23 are positioned in front of the film in the path of light rays from the focused image. Prisms 24 are placed in front of the lenses.

The lenses and prisms are mounted in appropriate frames 25 and 26 which are assembled in a casing 27 attached to the body 28 of the apparatus and carrying casing 13. The prisms typify means for deflecting the light to the lenses 23 in such manner that sharp and accurate images are obtained on the film and parallax and distortion done away with.

To obtain monochrome film images, the light rays are caused to pass through color mediums or filters before reaching the film. The color filters are of different colors so that each monochrome image, while conforming in shape and configuration to the object, has only that much of the object containing the color corresponding to that of its filter. In the example, the filters 29 are mounted in a frame 30 between lenses 23 and the film.

I have discovered that best results can be obtained with the filters close to the film while photographing. The closer they are to the film, the better the results. The invention involves means for causing the filters to be moved contiguous or against the film while the latter is stationary and away from the film during movement of the film so as not to rub against it when it moves. Although capable of various constructions, in the example here shown, a bell-crank lever pivotally mounted at its angle 31 as one arm 32 pivotally connected at its end to the filter frame and the other arm 34 projecting in the path of cam portions 35 of the claw construction. A spring bias 36 is provided for engaging the filters against the film. The arm 32 of the bell crank connects with an extension 37 on the filter frame 30 and the filter frame is slideable upon trackways 38. As the claw arm 35 moves to engage the film to pull down the same a picture length, the cam 35 engages the roller 39 on the end of the lever arm 34, thereby causing the lever arm 32 to swing counter-clockwise (Fig. 2) and remove the filter frame 30 from engagement with the film 21. This condition is retained until the cam 35 on the claw arm leaves the roller 39, at which time the film is stationary. As the cam 35 on the claw arm leaves the roller 39, the spring 36 draws the filter frame into contact with the film and the picture is exposed in the usual way. It is to be understood that the drawing in the present case omits features of moving picture cameras which are common and well known in the art and which will be easily supplied by one skilled in the art.

The lenses 10 and 11 mounted in the focusing barrel 12 comprise a focusing lens system which is movable for focusing purposes in the casing 13. The lens comprising units 15, 16 and 17 is an image receiving member having its light receiving surface on the unit 16 in the focus of the focusing lens system in such manner that a primary image is projected against this image receiving surface. Prisms 24 are located in an area covered by the rays transmitted through the image receiving lens and divert these rays into substantially parallel optical paths so that the rays from the prisms pass through the image forming lens system 23 whereby substantially identical secondary images are projected on the film 21. The rays from the image forming lens system 23, however, pass through color screens 29 which are of complemental value so that each secondary image projected on the film 21 is a mono-chrome image containing the light values passing through the respective complemental filter. The optical system comprising the image receiving lens, the prisms, the image forming lens system and the position of the film 21 is substantially a fixed focus system in that this optical system is so constructed and the parts therein so located that the rays of light from a primary image projected on the light receiving surface of the image receiving lens after passing through the fixed focus optical system always forms secondary images which are in focus on the plane of the film. Preferably, the image receiving lens comprising units 15, 16 and 17 is achromatic in such manner as to obviate distortion as previously set forth. It is to be understood that mechanical features of a moving picture camera which are well known in the art are omitted for the sake of clarity.

The apparatus shown can be converted into a projector. In such case, a light would be placed in back of the film and the film images projected simultaneously through the optical system and onto the screen where a many colored picture, formed by the addition of the monochrome pictures, would appear.

What is claimed is:—

1. In a color camera, a focusing lens system, an image receiving lens having its light receiving surface in the focus of said focusing lens system, a plurality of prisms in the field of said image receiving lens, a separate image forming lens system associated with each of said prisms, a color filter in the path of the light rays passing through each of said image forming lens systems and a mounting for said lenses whereby said lens systems may be adjusted one to the other.

2. A focusing lens system, an image receiving lens having its light receiving surface in the focus of said focusing lens, said image receiving lens being achromatic and being adapted to divert the rays of light of said primary image over a predetermined field, a plurality of prisms mounted in said field and being adapted to refract the rays of light of said field into substantially parallel optical paths, an image forming lens system for each of said prisms, complemental color filters in the path of the rays of light passing through said image forming lens systems, and adjustable means for all of said lenses.

3. A color camera comprising a focusing lens system, an image receiving lens having a substantially plane surface adapted to receive the image from said focusing lens system, said image receiving lens being adapted to transmit rays of light from each point of said image to each point in a predetermined area, a plurality of prisms adapted to divert a portion of the rays from said image receiving lens into the paths having substantially parallel optical axes, image forming lens systems having optical axes substantially parallel to the axis of said diverted rays, complemental color filters, there being one color filter for each of said image forming lens systems.

4. A color camera comprising a focusing lens, an image receiving member comprising a lens having a substantially plane surface toward the focusing lens, a plurality of prisms adapted to receive light rays passing through said image receiving member, and an image forming lens associated with each of said prisms to form an image on a light sensitive member, and the color screen in the path of the rays from each image forming lens.

5. In a color camera, in combination, a focusing lens, an image receiving member comprising a lens having a substantially plane surface located in the focus of said focusing lens, said image receiving member being adapted to disperse the light from each point of the image over a predetermined area, a plurality of prisms located within said area and adapted to divert a portion of the light rays from said image into the optical paths having substantially parallel axes, image forming lens systems in the path of said diverted rays, there being one image forming lens system for each prism, and color filter members in the path of the rays passing through said prisms and said image forming lens systems.

6. In a moving picture color camera, in combination, a focusing lens, an image receiving member comprising a lens having a substantially plane surface located in the focus of said focusing lens, said image receiving member being adapted to disperse the light from each point of the image over a predetermined area, a plurality of prisms located within said area and adapted to divert a portion of the light rays from said image into the optical paths having substantially parallel axes, image forming lens systems in the path of said diverted rays, there being one image forming lens system for each prism, color filter members in the path of the rays passing through said prisms and said image forming lens systems, means to intermittently move a film at substantially right angles to the optical axis of said image forming lens system, and means to intermittently move said color filters at right angles to the path of movement of said film.

7. In a moving picture camera, a stationary optical system adapted to project images on a light sensitive film, means to move said film intermittently, a color screen, and means to move said color screen at substantially right angles to the path of movement of said film and to retain said color screen stationary when said film is stationary.

8. In a moving picture camera, an optical system adapted to project images upon a light sensitive film, means to move said film intermittently, a color screen, and means to move said color screen against said film when said film is stationary and to move said color screen away from said film when said film is moved.

9. A color camera comprising a focusing lens system, a receiving lens having a front surface coincident with the focus of said focusing lens and adapted to receive on said front surface the primary image formed by the focusing lens, said focusing lens system being mounted for focusing movement relative to said receiving lens to focus the image formed by the focusing lens on the front surface of the receiving lens, a plurality of prisms fixedly mounted within the pencil of light rays from said receiving lens, an image forming lens system associated with each of said prisms and adapted to focus secondary images of said primary image upon a light sensitive surface, and a color screen associated with each of said lens forming systems.

In testimony whereof, I have hereunto set my hand.

MARSHALL DE FRANCISCO.